United States Patent
Kasuya et al.

(10) Patent No.: US 8,635,870 B2
(45) Date of Patent: Jan. 28, 2014

(54) WASTE HEAT UTILIZATION DEVICE FOR INTERNAL COMBUSTION ENGINE

(75) Inventors: Junichiro Kasuya, Isesaki (JP); Yasuaki Kanou, Isesaki (JP)

(73) Assignee: Sanden Corporation, Gunma (JP)

( * ) Notice: Subject to any disclaimer, the term of this patent is extended or adjusted under 35 U.S.C. 154(b) by 1022 days.

(21) Appl. No.: 12/594,819

(22) PCT Filed: Apr. 1, 2008

(86) PCT No.: PCT/JP2008/056466
§ 371 (c)(1),
(2), (4) Date: Jan. 12, 2010

(87) PCT Pub. No.: WO2008/126723
PCT Pub. Date: Oct. 23, 2008

(65) Prior Publication Data
US 2010/0101224 A1    Apr. 29, 2010

(30) Foreign Application Priority Data
Apr. 6, 2007 (JP) .................. 2007-100358

(51) Int. Cl.
*F01K 23/10* (2006.01)
*F02G 3/00* (2006.01)
*F01K 25/08* (2006.01)
*F01K 25/00* (2006.01)

(52) U.S. Cl.
USPC .................... 60/618; 60/616; 60/651; 60/671

(58) Field of Classification Search
USPC ............ 60/616, 618, 620, 624, 641.1, 641.2, 60/641, 641.7, 641.8, 641.15, 645–681
See application file for complete search history.

(56) References Cited

U.S. PATENT DOCUMENTS

| 4,736,111 A | * | 4/1988 | Linden .............................. 290/2 |
| 4,856,565 A | * | 8/1989 | Schoeffl et al. .................. 141/97 |
| 5,946,916 A | | 9/1999 | Ven et al. |
| 6,062,029 A | * | 5/2000 | Doe .......................... 60/641.15 |
| 6,232,679 B1 | * | 5/2001 | Norton ........................... 310/11 |
| 6,257,310 B1 | * | 7/2001 | Janko ............................. 164/61 |
| 7,637,108 B1 | * | 12/2009 | Langson ........................ 60/616 |
| 2004/0255591 A1 | | 12/2004 | Hisanaga et al. |

FOREIGN PATENT DOCUMENTS

| GB | 2 089 436 | | 6/1982 |
| GB | 2 405 450 | | 3/2005 |
| JP | 57-164193 | | 10/1982 |
| JP | 57164193 A | * | 10/1982 |
| JP | 61-155614 | | 7/1986 |
| JP | 63-131854 | | 6/1988 |
| JP | 10-141137 | | 5/1998 |
| JP | 2001-65406 | | 3/2001 |

* cited by examiner

*Primary Examiner* — Christopher Jetton
(74) *Attorney, Agent, or Firm* — Cozen O'Connor

(57) ABSTRACT

A waste heat utilization device recovering waste heat produced by an internal combustion engine from a heat medium includes a Rankine cycle circuit including an evaporator, an expander, a condenser and a pump serially arranged in a circulation line along which a combustible working fluid circulates. A casing air-tightly encloses the Rankine cycle circuit to chemically inactivate the Rankine cycle circuit.

12 Claims, 7 Drawing Sheets

WASTE HEAT UTILIZATION DEVICE FOR INTERNAL COMBUSTION ENGINE

RELATED APPLICATIONS

This is a U.S. National Phase Application under 35 USC §371 of International Application PCT/JP2008/056466 filed on Apr. 1, 2008.

This application claims the priority of Japanese Patent Application No. 2007-100358 filed Apr. 6, 2007, the entire content of which is hereby incorporated by reference.

TECHNICAL FIELD

This invention relates to a waste heat utilization device for an internal combustion engine, specifically a waste heat utilization device for an internal combustion engine, suited to be mounted on a vehicle.

BACKGROUND ART

As a waste heat utilization device for an internal combustion engine, a cooling device for an automotive internal combustion engine is disclosed. This cooling device constitutes a Rankine cycle circuit including an evaporator, an expander and a condenser serially arranged in a circulation line along which CFC as a working fluid (hereinafter referred to as "refrigerant") circulates, where heat is transferred from automotive engine cooling water to CFC in the evaporator. Drive power produced by the expander drives a radiator fan provided to the condenser, and CFC condensed in the condenser cools the engine (see Japanese Patent Application KOKAI Publication Sho 61-155614).

At present, in order to prevent ozone layer depletion, alternatives for CFC, such as R134a, are used as refrigerants for such cooling devices. Such alternatives for CFC have, however, a very high GWP (Global Warming Potential), so that there still exists a concern about their environmental impact.

To cope with this problem, it is conceivable to use a hydrocarbon-based natural refrigerant in the aforementioned conventional technology. The hydrocarbon-based refrigerant is however combustible. If this refrigerant leaks from the circulation line, the evaporator, the expander or the like, it may possibly ignite, or at worst, explode.

Further, the aforementioned conventional technology, in which the radiator fan provided to the condenser is driven by drive power produced by the expander, has a problem that malfunction of the Rankine cycle circuit due to some reason or a reduction in drive power produced by the expander results in insufficient cooling of the engine.

DISCLOSURE OF THE INVENTION

The present invention has been made in view of problems as mentioned above. The primary object of the present invention is to provide a waste heat utilization device for an internal combustion engine which allows a Rankine cycle circuit using a combustible refrigerant to function safely and properly.

In order to achieve the above object, a waste heat utilization device for an internal combustion engine according to the present invention is designed to recover waste heat produced by the internal combustion engine from a heat medium, and comprises a Rankine cycle circuit including an evaporator, an expander, a condenser and a pump serially arranged in a circulation line along which a combustible working fluid circulates, where the evaporator transfers heat from the heat medium to the working fluid, the expander expands the working fluid that has passed through the evaporator, thereby producing drive power, the condenser condenses the working fluid that has passed through the expander, and the pump forces the working fluid that has passed through the condenser toward the evaporator, a casing air-tightly enclosing the Rankine cycle circuit, and an inactivation means for creating a chemically-inactive condition inside the casing.

The above-described waste heat utilization device for the internal combustion engine can prevent the combustible working fluid that has leaked from the Rankine cycle circuit from undergoing oxidation reaction and igniting, etc., resulting in an improved safety of the Rankine cycle circuit and therefore of the waste heat utilization device.

In a preferred aspect of the above-described waste heat utilization device for the internal combustion engine, the inactivation means includes an evacuation port formed to the casing for use in evacuating the casing or a gas filling port formed to the casing for use in filling the casing with an inert gas.

This configuration enables creation of an oxygen-free condition inside the casing by creating a vacuum inside the casing or filling the casing with an inert gas, thereby reliably preventing ignition, etc. of the combustible working fluid that has leaked from the Rankine cycle circuit, resulting in a further improved safety of the Rankine cycle circuit and therefore of the waste heat utilization device.

Further, the vacuum created inside the casing or the inert gas filling the casing can prevent the heat produced by the Rankine cycle circuit from transmitting to the casing and to outside the casing, enabling a great improvement in thermal insulating property of the Rankine cycle circuit and therefore of the waste heat utilization device, without a thermal insulator.

Further, the vacuum created inside the casing can block the transmission of operating noise of the Rankine cycle circuit to the casing and to outside the casing, resulting in a greatly improved quietness of the Rankine cycle circuit and therefore of the waste heat utilization device.

In a preferred aspect, the above-described waste heat utilization device for the internal combustion engine further comprises a failure coping means detecting and coping with a failure of the Rankine cycle circuit, wherein when detecting a failure of the Rankine cycle circuit, the failure coping means issues a warning to outside the casing and stops the driving of the pump.

This configuration enables early detection of a leakage of the combustible working fluid from the Rankine cycle circuit and stopping of the operation of the Rankine cycle circuit, and thus, minimization of the leak, resulting in a further improved safety of the Rankin cycle circuit and therefore of the waste heat utilization device.

In a preferred aspect of the above-described waste heat utilization device for the internal combustion engine, the failure coping means includes a working fluid leakage detection means detecting a leakage of the working fluid inside the casing.

This configuration provides reliable detection of a leakage of the combustible working fluid from the Rankine cycle circuit, resulting in a further improved safety of the Rankin cycle circuit and therefore of the waste heat utilization device.

In a preferred aspect, the failure coping means includes a pressure increase detection means detecting a pressure increase inside the casing.

This configuration enables detection of not only a leakage of the combustible working fluid from the Rankine cycle circuit but also a casing breakage that allows air to flow into the casing from outside, resulting in a greatly improved safety of the Rankin cycle circuit and therefore of the waste heat utilization device.

In a preferred aspect, the heat medium is cooling water cooling the internal combustion engine, and the waste heat utilization device further comprises a first cooling water circuit through which cooling water circulates passing through the internal combustion engine and then through the evaporator, a second cooling water circuit including a radiator arranged outside the casing to cool, the cooling water with outside air, through which cooling water circulates passing through the radiator and then through the condenser, and pipe connecting means provided to the casing to allow the first cooling water circuit and the second cooling water circuit to extend from inside to outside the casing, keeping the casing airtight.

This configuration allows recovery of heat from the internal combustion engine, cooling of the working fluid with outside air, and condensation of the working fluid, while keeping the casing airtight. Consequently, this configuration allows the Rankine cycle circuit to function properly, while reliably providing improved safety, quietness and thermal insulating property of the Rankin cycle circuit and therefore of the waste heat utilization device.

In a preferred aspect, the waste heat utilization device further comprises an electrical generator arranged inside the casing to convert the drive power produced by the expander to electrical power, and a terminal provided to the casing to allow the electrical power generated by the electrical generator to be drawn out from inside the casing, keeping the casing airtight.

This configuration allows the electrical power generated by the electrical generator to be drawn out properly, while keeping the casing airtight. Consequently, this configuration allows the Rankine cycle circuit to function properly, while more reliably providing improved safety, quietness and thermal insulating property of the Rankin cycle circuit and therefore of the waste heat utilization device.

In a preferred aspect, the failure coping means detects a failure of the Rankin cycle circuit and stops the driving of the pump via the terminal.

This configuration allows the failure coping means to operate properly, while keeping the casing airtight, thereby providing improved safety, quietness and thermal insulating property of the Rankin cycle circuit and therefore of the waste heat utilization device, more reliably.

In a preferred aspect, the waste heat utilization device further comprises an electrical power detection means detecting the electrical power generated by the electrical generator, a third cooling water circuit through which cooling water circulates passing through the internal combustion engine and then through the radiator, and a flow distribution means distributing the flow of cooling water that has passed through the internal combustion engine to the first and third cooling water circuits, wherein when the electrical power detected by the electrical power detection means is greater than or equal to a preset value, the flow distribution means increases the flow of cooling water passing through the internal combustion engine and entering the third cooling water circuit.

This configuration allows the Rankine cycle circuit to be caused to operate to produce a reduced electrical power, when actually-produced electrical power reaches or exceeds demanded electrical power, thereby preventing the electrical generator from overheating inside the casing due to overload, thereby reliably preventing ignition, etc. of the working fluid which happen when overheating of the electrical generator and leakage of the combustible working fluid occur at the same time, resulting in a further improved safety of the Rankine cycle circuit and therefore of the waste heat utilization device.

In a preferred aspect, when the failure coping means detects a failure of the Rankin cycle circuit, the flow distribution means directs all the flow of cooling water that has passed through the internal combustion engine to the third cooling water circuit.

This configuration allows the internal combustion engine to be cooled by means of the radiator using outside air when the Rankin cycle circuit has a failure, namely it is malfunctioning or at rest, and therefore allows the Rankine cycle circuit to function more safely and properly.

BEST MODE OF CARRYING OUT THE INVENTION

Figure 1:
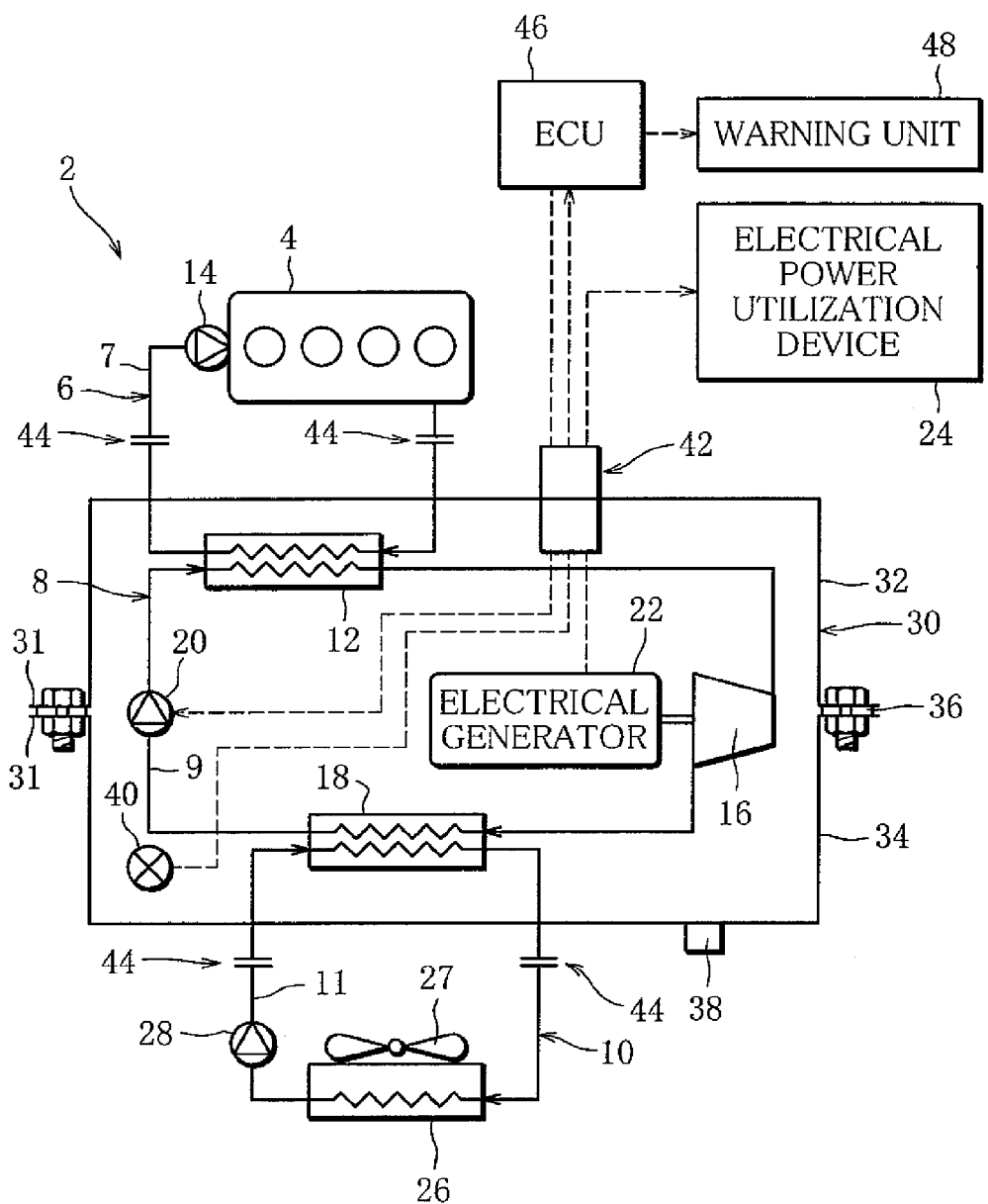
FIG. 1 is a schematic diagram showing a waste heat utilization device for an internal combustion engine according to a first embodiment of the present invention.

Referring to the drawings attached, embodiments of the present invention will be described below.

First, a first embodiment will be described.

FIG. 1 is a schematic diagram showing a waste heat utilization device 2 for an internal combustion engine according to a first embodiment. The waste heat utilization device 2 comprises a first cooling water circuit 6 through which cooling water circulates, thereby cooling an automotive engine (internal combustion engine) 4, for example, a Rankine cycle circuit 8 (hereinafter referred to as "cycle 8") through which a combustible hydrocarbon-based (HC) refrigerant circulates, thereby recovering waste heat produced by the engine 4, and a second cooling water circuit 10 through which cooling water circulates, thereby cooling the refrigerant.

The first cooling water circuit 6 constitutes a closed circuit including an evaporator 12 and a water pump 14 serially arranged in a circulation line 7 extending from the engine 4, where driving the water pump 14 causes the cooling water to circulate.

The evaporator 12 is a heat exchanger allowing heat transfer between the cooling water circulating through the first cooling water circuit 6 and the refrigerant circulating through the cycle 8, and therefore allowing the waste heat produced by the engine 4 to be recovered and transferred to the cycle 8, where the cooling water heated by the engine 4, or in other words, hot water serves as a heat medium. The cooling water, which has dropped in temperature by the refrigerant absorbing heat from it in the evaporator 12, is then heated and becomes hot water again by cooling the engine 4.

The water pump 14 is driven depending on the revolving speed of the engine 4 to make the cooling water satisfactorily circulate throughout the first cooling water circuit 6.

The cycle 8, on the other hand, constitutes a closed circuit including the evaporator 12, an expander 16, a condenser 18 and a refrigerant pump (pump) 20 serially arranged in a circulation line (working fluid circulation line) 9, where driving the refrigerant pump 20 causes the refrigerant to circulate.

The expander 16 is a fluid device which produces drive power causing rotation or the like, through expansion of the refrigerant that has turned into superheated vapor by being heated in the evaporator 12. An electrical generator 22 is connected to the expander 16. It is desirable that the expander 16 and the electrical generator 22 constitute a sealed integrated structure. The drive power produced by the expander 16 is converted into electrical power in an airtight condition, which is usable by an electrical power utilization device 24 outside the waste heat utilization device 2.

The condenser 18 is a heat exchanger allowing heat transfer between the refrigerant discharged from the expander 16 and the cooling water circulating through the second cooling water circuit 10, thereby condensing, or liquefying the refrigerant. The refrigerant condensed by the condenser 18, namely liquid refrigerant is forced to the evaporator 12 by the refrigerant pump 20.

The refrigerant pump 20 is an electrical pump in which a movable part is moved depending on an input signal delivered to a drive section of the pump 20, and makes the refrigerant satisfactorily circulate throughout the cycle 8. The pump 20 and the expander 16 may constitute an integrated structure, where the pump 20 is driven by power produced by the expander 16.

The second cooling water circuit 10 constitutes a closed circuit including the condenser 18, a radiator 26 and a second water pump 28 serially arranged in a circulation line 11, where driving the second water pump 28 causes the cooling water to circulate.

The radiator 26 is a heat exchanger allowing heat transfer between the cooling water circulating through the second cooling water circuit 10 and outside air, where driving an electrical fan 27 causes the cooling water heated in the condenser 18, namely hot water to be cooled with outside air. The cooling water, which has dropped in temperature by the outside air absorbing heat from it in the radiator 26, is then heated and becomes hot water again by cooling the refrigerant in the condenser 18.

The second water pump 28 is an electrical pump in which a movable part is moved depending on an input signal delivered to a drive section of the pump 28, and makes the cooling water satisfactorily circulate throughout the second cooling water circuit 10.

A casing 30 air-tightly encloses the cycle 8.

Figure 2:
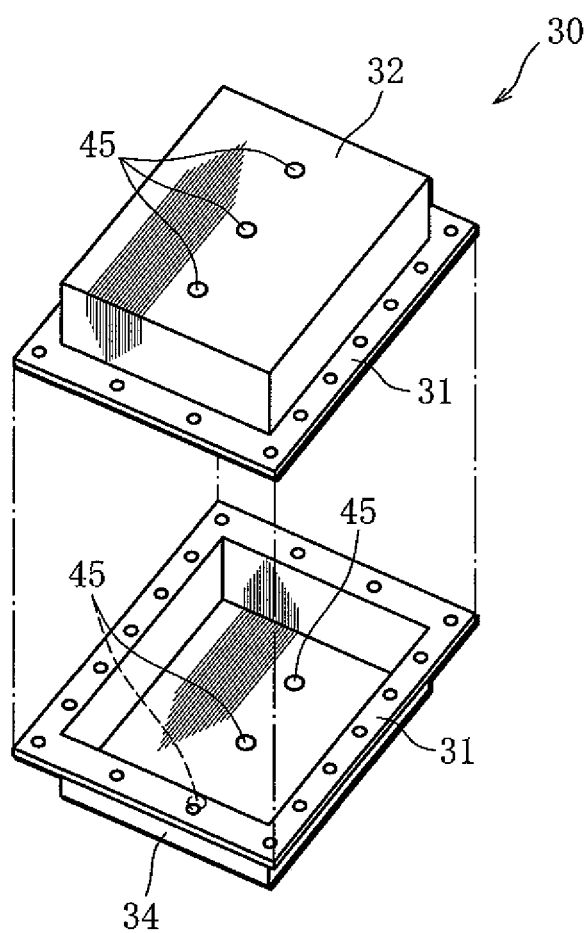
FIG. 2 is a perspective view showing a casing indicated in FIG. 1.

As shown also in FIG. 2, the casing 30 comprises an upper cover 32 and a lower cover 34 each in the shape of a hat with a projecting edge 31, where the projecting edges 31 superposed with a sealing member 36 between are fastened together by a plurality of bolts.

The lower cover 34 has an evacuation port 38 at an appropriate location. It is possible to evacuate the casing 30 using a pump or the like, not shown, connected to the evacuation port 38 (inactivation means).

Inside the casing 30, an HC sensor (working fluid leakage detection means) for detecting a leakage of the HC refrigerant is provided at an appropriate location. A conductive lead extending from the HC sensor 40 is electrically connected to a terminal 42 provided to the casing 30, at an appropriate location.

The terminal 42 is a connector providing an electrical connection between the inside and the outside of the casing 30. Not only the lead from the HC sensor but also leads from the pump 20 and the electrical generator 22 are connected to the terminal 42. The terminal 42 is designed to allow electrical devices provided inside the casing 30 to be electrically connected to devices or the like outside the casing 30, keeping the casing 30 airtight.

Flanged connectors (pipe connecting means) 44 are welded to the outer surface of the upper and lower covers 32, 34, at appropriate locations, to allow the circulation lines 7 and 11 to extend from inside to outside the casing 30, keeping the casing airtight. FIG. 2 shows the upper and lower covers 32, 34 in which only holes 45 have been already formed prior to fitting or forming the flanged connectors 44, the terminal 42 and the evacuation port 38.

Provision of such terminal 42 and flanged connectors 44 makes it possible to allow the cycle 8 to operate smoothly, maintaining the casing 30 in the evacuated condition. Particularly, the terminal 42 is not only electrically connected to the electrical power utilization device 24, thereby allowing smooth extraction of the electrical power generated by the electrical generator 22, but also electrically connected to an electronic control unit (ECU) 46 performing overall control over the vehicle and the waste heat utilization device 2.

A warning unit 48 is electrically connected to the ECU 46. In response to an HC leak signal delivered from the HC sensor 40 to the ECU 46 via the terminal 42, the ECU 46 performs cycle 8 failure coping control to issue a warning through the warning unit 48 and stop the operation of the cycle 8 (failure coping means).

Figure 3:
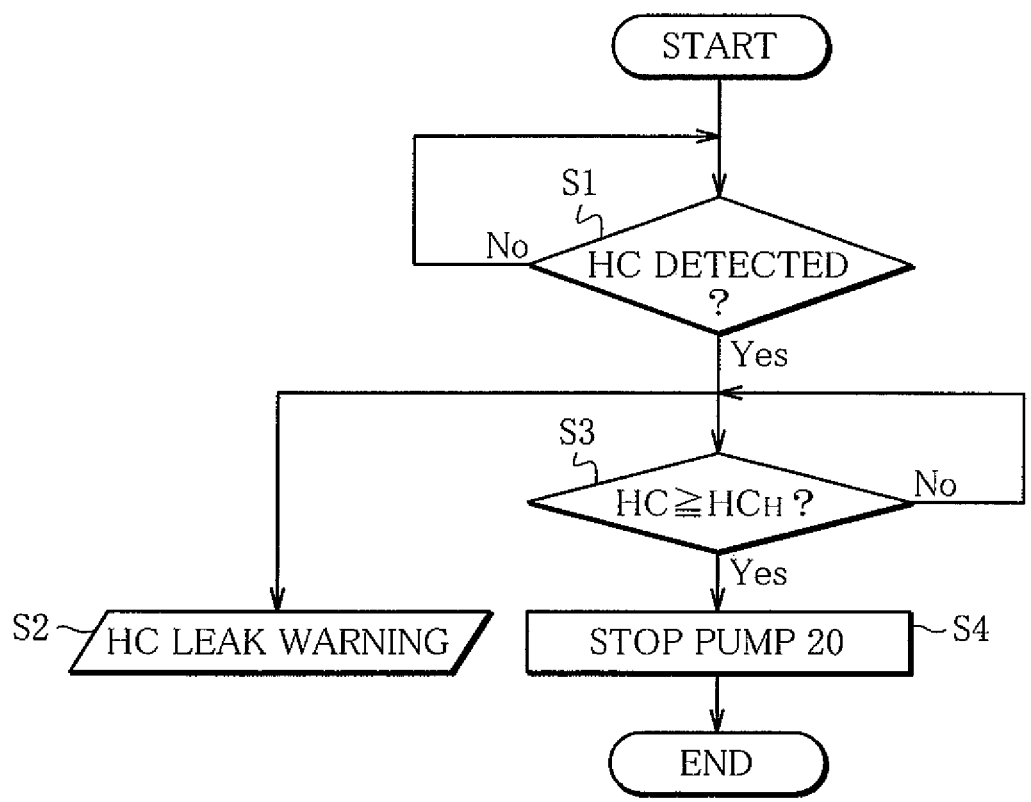
FIG. 3 is a flow chart showing a failure coping control routine executed by an ECU indicated in FIG. 1.

Next, referring to the flow chart shown in FIG. 3, a failure coping control routine will be described in detail.

When the failure coping control starts, control flow first goes to S1 ("S" stands for "step").

At S1, whether or not HC is detected inside the casing 30 is determined. If the result of determination is "Yes", namely it is determined that HC has been detected, control flow goes to S2, where an HC leak warning is issued through the warning unit 48, and then goes to S3. If the result of determination is "No", namely it is determined that HC is not detected, step S1 is performed again.

When control flow goes to S3, whether or not the amount of HC detected inside the casing 30 is greater than or equal to a preset upper limit HCH for HC quantity is determined. If the result of determination is "Yes", namely it is determined that the HC quantity detected is greater than or equal to the preset upper limit HCH for HC quantity, control flow goes to S4, and if the result of determination is "No", namely it is determined that the HC quantity detected is less than the preset upper limit HCH for HC quantity, step S3 is performed again.

At S4, driving of the pump 20 is stopped, and the failure coping control ends.

As stated above, the present embodiment is designed to properly perform failure coping control to detect a HC refrigerant leak from the cycle 8, issue a warning and stop the pump 20 depending on the amount of HC detected.

Further, the present invention comprises a casing 30 airtightly enclosing the cycle 8, and the casing 30 has an evacuation port 38 for use in evacuating the casing 30. By evacuating the casing 30 through the evacuation port 38, an oxygen-free condition can be created inside the casing 30 containing the cycle 8. This reliably prevents ignition, etc. of the HC refrigerant that has leaked from the cycle 8, resulting in an improved safety of the cycle 8 and therefore of the waste heat utilization device 2.

When the casing 30 is evacuated, transmission of operating noise to the casing 30 and to outside the casing 30 is blocked, resulting in a greatly improved quietness of the cycle 8 and therefore of the waste heat utilization device 2. Further, heat produced by the cycle 8 is prevented from transmitting to the casing 30 or to outside the casing 30, enabling a great improvement in thermal insulating property of the cycle 8 and therefore of the waste heat utilization device 2 without a thermal insulator.

Further, the flanged connectors 44 provided to the casing 30 allows the first cooling water circuit 6 and second cooling water circuit 10 to extend from inside to outside the casing 30, keeping the casing 30 airtight, and therefore allows smooth recovery of heat from the engine 4, cooling of the HC refrigerant with outside air and condensation of the HC refrigerant, keeping the casing 30 airtight.

Further, the terminal 42 allowing the electrical power generated by the electrical generator 22 to be drawn out from inside the casing 30, keeping the casing 30 airtight, is provided to the casing 30, and failure detection and failure coping under failure coping control is carried out via the terminal 42. Thus, the provision of such terminal enables appropriate failure coping control as well as extraction of the electrical power generated by the electrical generator 22, keeping the casing 30 airtight. This allows the cycle 8 to function properly, while providing improved safety, quietness and thermal insulating property of the cycle 8 and therefore of the waste heat utilization device 2, more reliably.

Specifically, the failure coping control is designed to issue a warning to outside the casing 30 in response to an HC leak, and stop the driving of the pump 20 causing the refrigerant to circulate through the cycle 8 when the HC leakage reaches or exceeds the preset upper limit HCH for HC quantity. The upper limit HCH is preset to a level that does not lead to ignition of HC that has leaked into air, for example. This ensures that when the HC refrigerant continues leaking, the operation of the cycle 8 is stopped, and enables early detection of a leakage of the HC refrigerant from the cycle 8 and minimization of the leak, resulting in a further improved safety of the cycle 8 and therefore of the waste heat utilization device 2.

Next, a second embodiment will be described.

Figure 4:
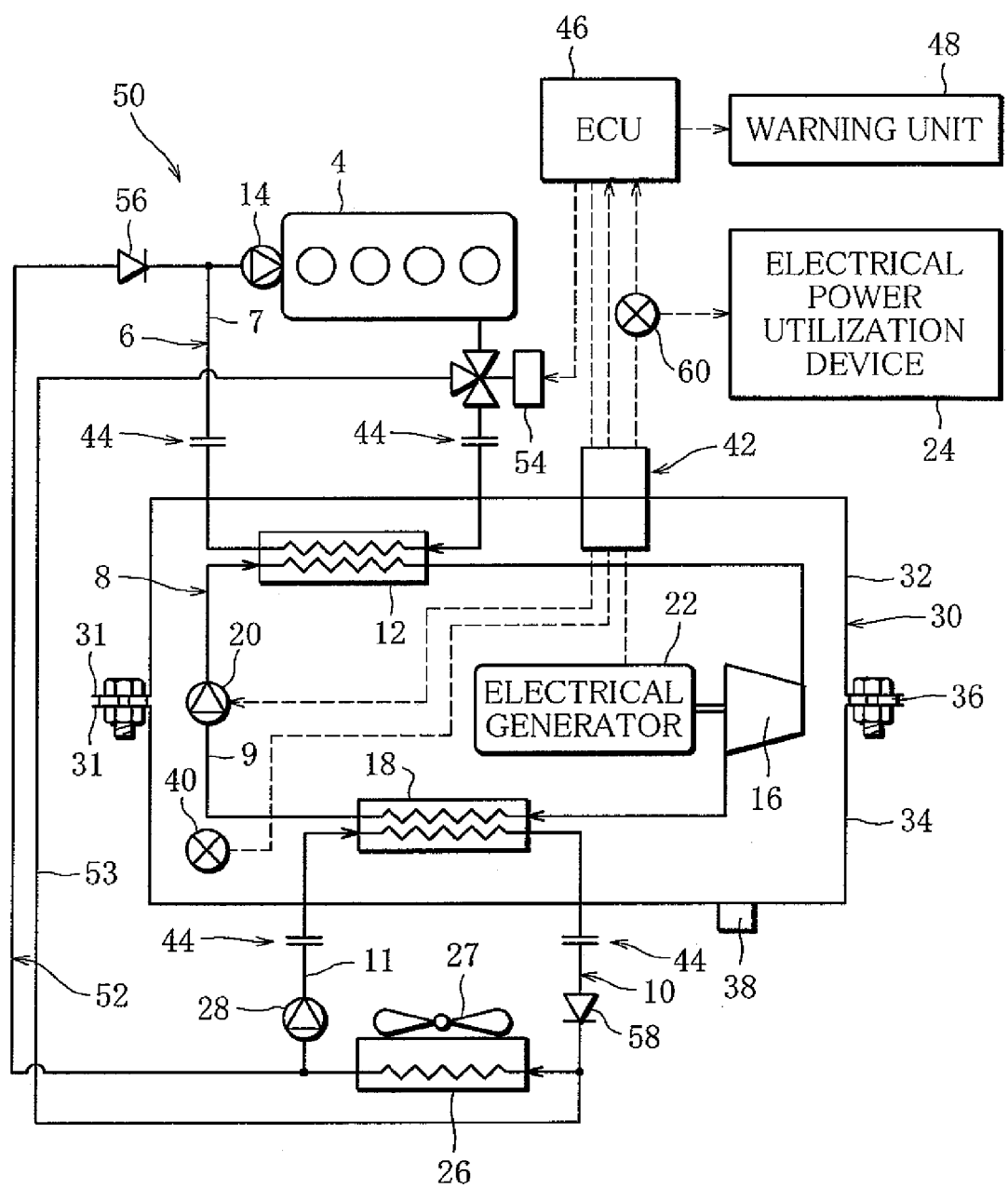
FIG. 4 is a schematic diagram showing a waste heat utilization device for an internal combustion engine according to a second embodiment of the present invention.

FIG. 4 shows a waste heat utilization device 50 according to a second embodiment. The waste heat utilization device 50 constitutes a third cooling water circuit 52 through cooling water circulates passing through the radiator 26 and the engine 4, where a three-way valve 54, a constituent of the third cooling water circuit 52, undergoes valve position control. In the other respects, this embodiment is similar to the first embodiment. Thus, the description will be given mainly of this difference.

The third cooling water circuit 52 is provided outside the casing 30, and constitutes a closed circuit including the three-way valve 54, the radiator 26, a check valve 56 and the water pump 14 serially arranged in a circulation line 53 extending from the engine 4, where driving the water pump 14 causes the cooling water to circulate passing through the engine 4 and then through the radiator 26. The section of the circulation line 53 from the engine 4 to the three-way valve 54 and the section thereof from the check valve 56 to the water pump 14 are shared by the circulation line 7, while the section of the circulation line 53 from before the radiator 26 to after it is shared by the circulation line 11.

The three-way valve 54 is a linear electrically-operated valve having one inlet port and two outlet ports, in which a movable valve member is continuously moved in proportion to an input signal delivered to a drive section of the three-way valve 54 to distribute the flow of cooling water coming in at the inlet port to the two outlet ports, where the proportion of flow distributed to each is be finely adjustable. The inlet port and the outlet port opposite the inlet port of the three-way valve 54 connect to the circulation line 7, while the other outlet port connects to the circulation line 53, which connects to the circulation line 11, upstream of the radiator 26.

The check valve 56 prevents the cooling water flowing along the circulation line 7 from flowing back into the circulation line 53. Incidentally, a check valve 58 is provided in the circulation line 11, upstream of the radiator 26, to prevent the cooling water flowing along the circulation line 53 from flowing back into the circulation line 11.

Here, the amount of electrical power generated by the electrical generator 22 is detected by an electrical power sensor 60, after the terminal 42. The electrical power sensor 60 as well as the three-way valve 54 is electrically connected to the ECU 46.

In addition to failure coping control, the ECU 46 performs valve position control, namely operates the three-way valve 54 depending on the electrical power EP detected by the electrical power sensor 60.

Figure 5:
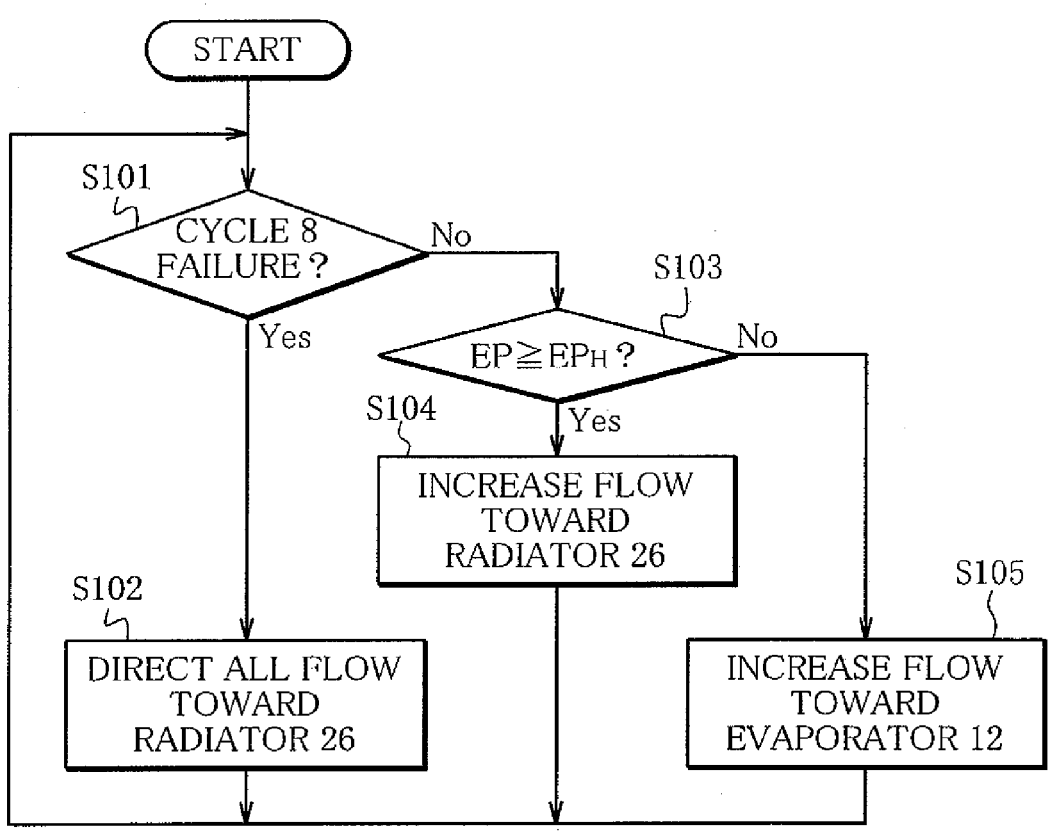
FIG. 5 is a flow chart showing a valve position control routine executed by the ECU indicated in FIG. 4.

Next, referring to the flow chart shown in FIG. 5, a valve position control routine will be described in detail.

When the valve position control starts, control flow goes to S101. This control routine has a reset function to restore predetermined initial conditions when the valve position control is stopped at any of the below-described steps.

At 5101, whether or not a failure of the cycle 8 has been detected under failure coping control is determined. Specifically, in the present embodiment, whether or not an HC leak warning has been issued and the pump 20 has been stopped is determined. If the result of determination is "Yes", namely it is determined that the cycle 8 has a failure, control flow goes to S102, and if the result of determination is "No", namely it is determined that the cycle 8 has not a failure, control flow goes to S103.

When control flow goes to S102, the three-way valve 54 is operated to direct all the incoming flow to the radiator 26 and no flow to the evaporator 12, thereby establishing the circulation through the third cooling water circuit 52. Control flow then goes back to S101.

When control flow goes to S103, whether or not the electrical power EP detected by the electrical power sensor 60 is greater than or equal to a preset upper limit EPH for electrical power is determined. If the result of determination is "Yes", namely it is determined that the electrical power EP is greater than or equal to the preset upper limit EPH for electrical power, control flow goes to S104, and if the result of determination is "No", namely it is determined that the electrical power EP is less than the preset upper limit EPH for electrical power, control flow goes to S105.

When control flow goes to S104, the three-way valve 54 is operated to increase the flow directed to the radiator 26 and decrease the flow directed to the evaporator 12. Control flow then goes back to S101.

When control flow goes to S105, the three-way valve 54 is operated to increase the flow directed to the evaporator 12 and decrease the flow directed to the radiator 26. Control flow then goes back to S101.

Thus, when the valve position control executing the valve position control routine is started, a series of steps S101 and S102, a series of steps S101, S103, S104 and a series of steps S101, S103 and S105 are selectively repeated. The valve position control routine may be provided as two separate routines, one including steps S101 and S102 and the other including steps S101 and S103 to S105.

Like the first embodiment, the waste heat utilization device 50 according to the second embodiment allows the cycle 8 to function properly, while reliably providing improved safety, quietness and thermal insulating property of the cycle 8 and therefore of the waste heat utilization device 2.

Particularly, the second embodiment includes the third cooling water circuit 52 through which the cooling water circulates passing through the engine 4 and then through the radiator 26, where valve position control on the three-way valve 54 is performed to distribute the flow of cooling water coming in from the engine 4 to the first cooling water circuit 6 and the third cooling water circuit 52. This makes it possible to cause the cycle 8 to operate to generate reduced electrical power, when the electrical power actually generated by the electrical generator 22 reaches or exceeds demanded electrical power, thereby preventing the electrical generator 22 from overheating inside the casing 30 due to overload, thereby reliably preventing ignition, etc. of the HC refrigerant which happen when overheating of the electrical generator 22 and leakage of the HC refrigerant inside the casing 30 occur at the same time, resulting in a further improved safety of the cycle 8 and therefore of the waste heat utilization device 50.

Further, under the valve position control, all the flow of cooling water coming from the engine 4 is directed to the third cooling water circuit 52, if a failure of the cycle 8 is detected under the failure coping control. Thus, the engine 4 is cooled by means of the radiator 26 using outside air, when the cycle 8 has a failure, namely it is malfunctioning or at rest, which allows the cycle 8 to function more safely and properly.

In the above, embodiments of the present invention have been described. The present invention is however not restricted to the above-described embodiments but can be modified in various ways without departing from the spirit and scope of the present invention.

For example, although in the described embodiments, the casing 30 is evacuated, what is required is to create a chemically-inactive condition inside the casing 30, thereby preventing oxidation reaction inside the casing 30. For example, the evacuation port 38 may be replaced with a gas filling port, not shown, for use in filling the casing 30 with an inert gas such as nitrogen gas, carbon dioxide gas or the like (inactivation means). This can prevent ignition, etc. even if the refrigerant leaks inside the casing 30, resulting in an improved safety of the waste gas utilization device 2. In addition, use of an inert gas with a low thermal conductivity leads to an improved thermal insulating property.

Although in the described embodiments, failure coping control is carried out depending on the amount of HC detected by the HC sensor 40, failure coping control may be carried out depending on pressure increase inside the casing 30 as long as the casing 30 is evacuated. Thus, a pressure sensor may be provided inside the casing 30 in place of the HC sensor 40.

Figure 6:
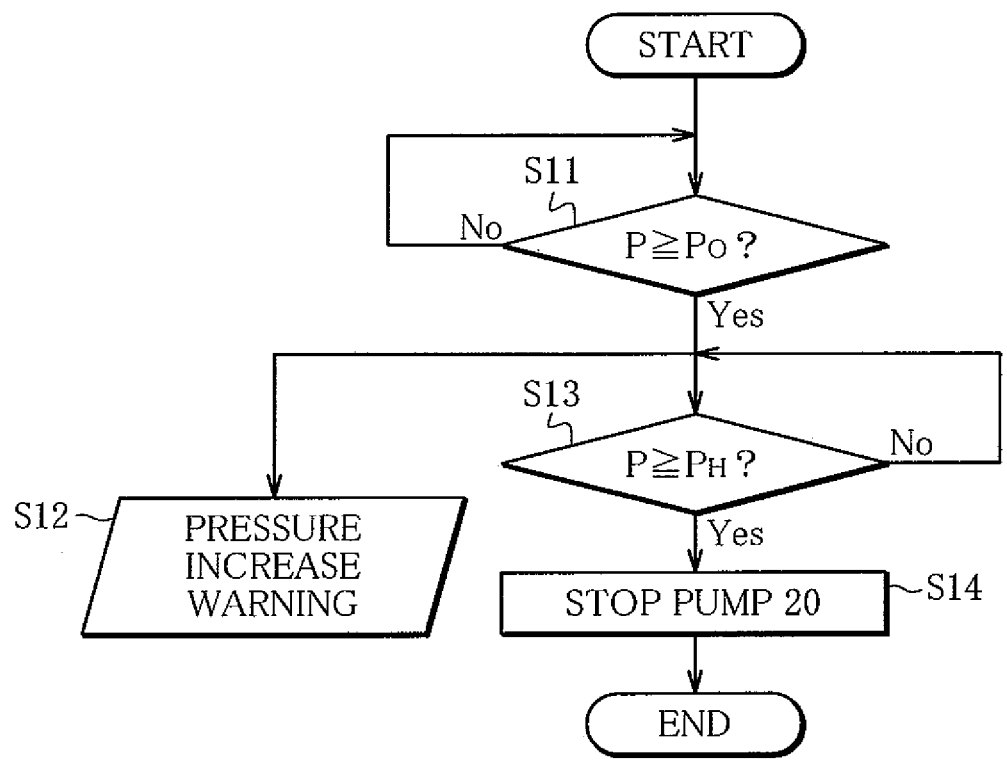
FIG. 6 is a flow chart showing a variant of the failure coping control routine executed by the ECU indicated in FIG. 1.

In this case, as the flow chart of FIG. 6 shows, when the pressure P inside the casing 30 increases to a preset pressure value PO or above ("Yes" at S11), a pressure increase warning is issued (S12), and when the pressure P further increases to a preset upper limit PH or above ("Yes" at S13), the refrigerant pump 20 is stopped (S14). The pressure value PO is, for example zero in terms of absolute pressure to provide reliable detection of a leakage of the HC refrigerant inside the casing 30.

This can also detect a pressure increase inside the casing 30 caused by a casing breakage that allows air to flow into the casing 30 from outside, resulting in a further improved safety of the cycle 8 and therefore of the waste heat utilization device.

Figure 7:
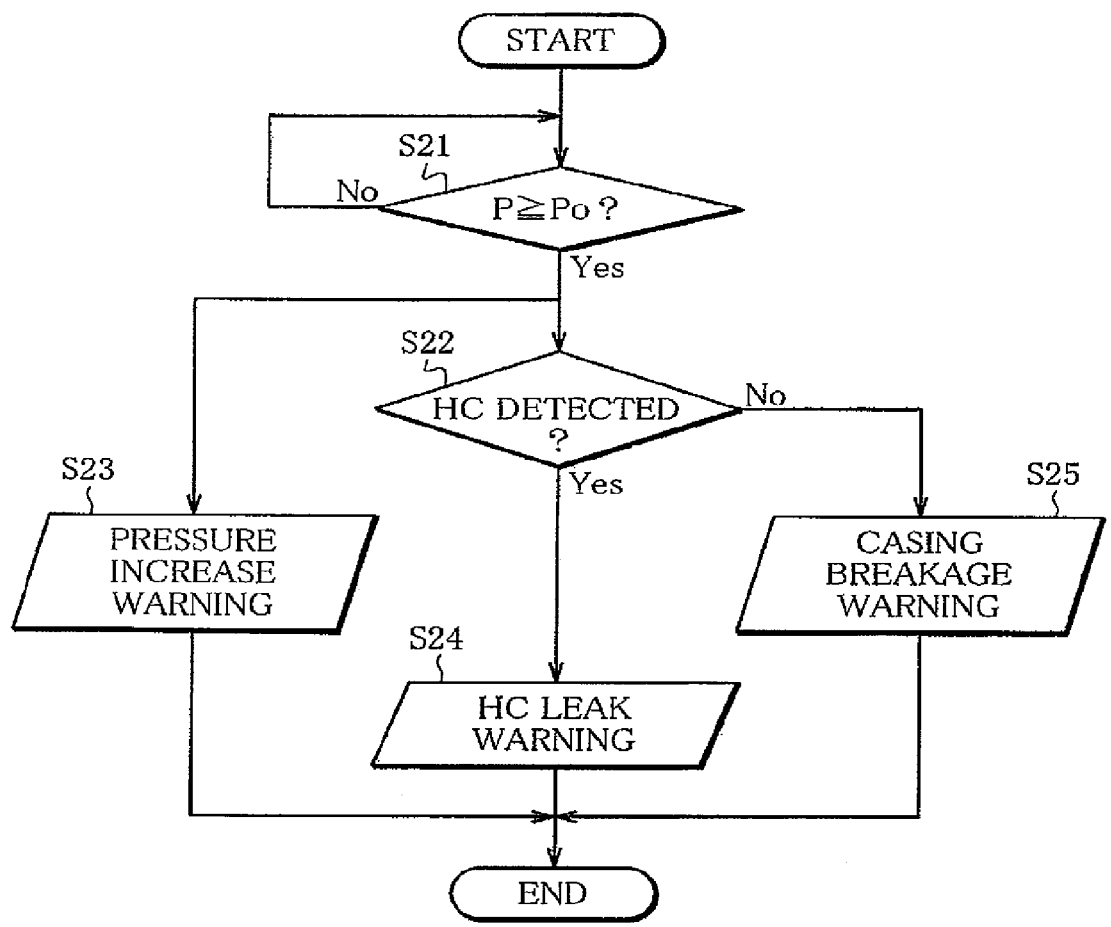
FIG. 7 is a flow chart showing a variant of the failure coping control routine executed by the ECU indicated in FIG. 1, which is different in the manner of issuing a warning.

Both the pressure sensor and the HC sensor 40 may be provided inside the casing 30, in which case, as seen from the flow chart shown in FIG. 7, it is possible to first evaluate the pressure P inside the casing 30 (S21) and then determine whether or not there is a HC leakage inside the case 30 (S22), thereby issuing three types of warnings, i.e., pressure increase warning (S23), HC leak warning (S24) and casing breakage warning (S25). This allows prompter and detailed detection of the cycle 8 failure, resulting in a furthermore improved safety of the cycle 8 and therefore of the waste heat utilization device.

In the above-described embodiments, if the pump 20 and the expander 16 constitute an integrated structure so that the pump 20 is driven by power produced by the expander 16, the driving of the pump 20 is stopped under failure coping control by the ECU 46 delivering a signal for stopping the operation of the electrical generator 22 to the electrical generator 22 via the terminal 42.

In the above-described embodiments, a radiator, not shown, may be provided in the first cooling water circuit 6 to further promote the cooling of the engine 4.

The invention claimed is:

1. A waste heat utilization device recovering waste heat produced by an internal combustion engine from a heat medium, the device comprising:
   a Rankine cycle circuit including an evaporator, an expander, a condenser and a pump serially arranged in a circulation line for circulation of a combustible working fluid wherein, during operation, the evaporator transfers heat from the heat medium to the working fluid, the expander expands the working fluid passing through the evaporator to produce drive power, the condenser condenses the working fluid passing through the expander, and the pump forces the working fluid passing through the condenser toward the evaporator,
   a casing to air-tightly enclose the Rankine cycle circuit, chemically inactivating the Rankine cycle circuit;
   a first cooling water circuit for circulation of cooling water through the evaporator after passing through the internal combustion engine;
   a second cooling water circuit including a radiator outside the casing to cool the cooling water with outside air, for circulation of the cooling water through the condenser after passing through the radiator;
   a third cooling water circuit for circulation of cooling water through the radiator after passing through the internal combustion engine; and
   a failure coping device comprising:
      a sensor to detect a failure of the Rankine cycle circuit; and
      an electronic control unit configured to cope with a failure when a failure is detected by the detecting section by issuing a warning to outside of the casing and by stopping the driving of the pump.

2. The waste heat utilization device according to claim 1, wherein:
   the sensor comprises a working fluid leakage sensor to detect a leakage of the working fluid inside the casing.

3. The waste heat utilization device according to claim 2, wherein:
   the working fluid comprises a hydrocarbon-based refrigerant; and
   the working fluid sensor comprises a hydrocarbon sensor.

4. The waste heat utilization device according to claim 1, wherein:
   the sensor comprises a pressure sensor to detect a pressure increase inside the casing.

5. The waste heat utilization device according to claim 1, further comprising:
connectors connected to the casing, the connectors being configured to allow circulation lines of the first, second, and third cooling water circuits to extend from inside to outside the casing in an airtight manner.

6. The waste heat utilization device according to claim 5, wherein the connectors comprise flanged connectors.

7. The waste heat utilization device according to claim 1, further comprising:
an electrical generator inside the casing to convert the drive power produced by the evaporator to electrical power; and
a terminal provided through the casing, in an airtight manner, to draw the electrical power generated by the electrical generator from inside the casing to outside the casing.

8. The waste heat utilization device according to claim 7, wherein:
the electronic control unit is configured to stop the driving of the pump via the terminal.

9. The waste heat utilization device according to claim 7, further comprising:
an electrical power detector to detect the electrical power generated by the electrical generator, and
a flow distribution valve to distribute the flow of cooling water to the first and third cooling water circuits after passing through the internal combustion engine,
wherein, when the electrical power detected by the electrical power detector is greater than or equal to a preset value, the flow distribution valve is configured to increase the flow of cooling water passing through the internal combustion engine and entering the third cooling water circuit.

10. The waste heat utilization device according to claim 9, wherein,
when the sensor detects a failure of the Rankin cycle circuit, the flow distribution valve directs all the flow of cooling water to the third cooling water circuit after passing through the internal combustion engine.

11. The waste heat utilization device recovering waste heat produced by an internal combustion engine from a heat medium, the device comprising:
a Rankine cycle circuit including an evaporator, an expander, a condenser and a pump serially arranged in a circulation line for circulation of a combustible working fluid wherein, during operation, the evaporator transfers heat from the heat medium to the working fluid, the expander expands the working fluid passing through the evaporator to produce drive power, the condenser condenses the working fluid passing through the expander, and the pump forces the working fluid passing through the condenser toward the evaporator;
a casing to air-tightly enclose the Rankine cycle circuit, chemically inactivating the Rankine cycle circuit;
a first cooling water circuit for circulation of cooling water through the evaporator after passing through the internal combustion engine;
a second cooling water circuit including a radiator outside the casing to cool the cooling water with outside air, for circulation of the cooling water through the condenser after passing through the radiator;
a third cooling water circuit for circulation of cooling water through the radiator after passing through the internal combustion engine;
an electrical power detector to detect the electrical power generated by the electrical generator;
a flow distribution valve to distribute the flow of cooling water to the first and third cooling water circuits after passing through the internal combustion engine,
wherein, when the electrical power detected by the electrical power detector is greater than or equal to a preset value, the flow distribution valve is configured to increase the flow of cooling water passing through the internal combustion engine and entering the third cooling water circuit.

12. The waste heat utilization device according to claim 11, further comprising:
an electrical control unit coupled to the electrical power detector and the flow distribution valve, the electrical control unit configured to cause the flow distribution valve to distribute the flow of cooling water, when the electrical power detected by the electrical power detector is greater than or equal to the preset value.

* * * * *